United States Patent

[11] 3,607,846

| [72] | Inventors | Adel F. Halasa<br>Akron;<br>David P. Tate, Northfield, both of Ohio |
|---|---|---|
| [21] | Appl. No. | 792,825 |
| [22] | Filed | Jan. 21, 1969 |
| [45] | Patented | Sept. 21, 1971 |
| [73] | Assignee | The Firestone Tire & Rubber Company<br>Akron, Ohio<br>Continuation-in-part of application Ser. No. 709,885, Mar. 4, 1968, and a continuation-in-part of 760,077, Sept. 16, 1968. |

[54] PROCESS OF JOINING LITHIATED POLYMERS OR COPOLYMERS
15 Claims, No Drawings

[52] U.S. Cl............................................... 260/85.1,
260/89.7, 260/91.3, 260/92.1, 260/92.3, 260/93.5, 260/94.7, 260/96

[51] Int. Cl............................................... C08d 5/04,
C08d 5/02, C08d 5/00

[50] Field of Search........................................... 260/85.1, 94.7

[56] References Cited
UNITED STATES PATENTS

| 2,962,479 | 11/1960 | Aldridge et al. ............... | 260/73 |
|---|---|---|---|
| 3,078,254 | 2/1963 | Zelinski et al. ............... | 260/94.7 X |
| 3,135,716 | 6/1964 | Uvaneck et al. ............... | 260/94.2 X |
| 3,281,383 | 10/1966 | Zelinski et al. ............... | 260/23.7 |
| 3,318,862 | 5/1967 | Hinton ........................ | 260/94.2 |
| 3,382,225 | 5/1968 | Naylor......................... | 260/94.3 |
| 3,468,972 | 7/1969 | Hsieh .......................... | 260/94.7 X |

FOREIGN PATENTS

| 1,144,151 | 3/1969 | Great Britain............... | 260/94.7 |
|---|---|---|---|
| 1,478,225 | 3/1967 | France ........................ | 260/877 X |

*Primary Examiner*—Joseph L. Schofer
*Assistant Examiner*—William F. Hamrock
*Attorneys*—S. M. Clark and S. B. Kuykendall ABSTRACT: Polymers of increased molecular weight are produced from plastic and/or rubbery polymers derived from vinylidene monomers by reaction with an organic halogen compound in the presence of an alkali metal hydrocarbon and also in the presence of an accelerator which is a Lewis base. The reactant polymers include polystyrene and similar plastic polymers and rubbery polymers such as polybutadiene and butadiene-styrene copolymers. The organic halogen compound is any carbon compound containing at least one reactive halogen atom per molecule. The halogen is fluorine, chlorine, bromine and/or iodine. The alkali metal hydrocarbon is preferably a "live" polymer containing reactive alkali metal, e.g., polybutadiene produced by polymerization of butadiene-1,3 by means of a lithium initiator. The Lewis base may be organic or inorganic, but it is preferred to use organic compounds and especially ethers. Preferred products are nonflow rubbery polymers.

PROCESS OF JOINING LITHIATED POLYMERS OR COPOLYMERS

This application is a continuation-in-part of applications Ser. No. 709,885, filed Mar. 4, 1968 and Ser. No. 760,077 filed Sept. 16, 1968.

The invention relates to increasing the molecular weight of polymers derived at least in part from a vinylidene monomer using an organic halogen compound as a joining agent. The reaction is carried out in the presence of an alkali metal hydrocarbon, such as an alkyllithium or a polymer containing at least one alkali metal atom per molecule, and the reaction speed is increased by using as an accelerator, a polar compound which is a Lewis base.

The joining agent causes polymer chains to join together to produce polymers of increased molecular weight. Part or all of the joining agent may become a part of the polymer that is formed, but this is not necessarily so.

A Lewis base is a substance with a tendency to donate a pair of electrons and thereby to share such pair of electrons with another substance.

The organic halogen compound utilized in the process of the invention is any carbon compound containing at least one reactive halogen atom per molecule. The halogen can be fluorine, chlorine, bromine and/or iodine; chlorine and/or bromine are the preferred halogens. The halogen (or halogens) is (are) attached to a single-carbon atom, or two or more halogens are attached to adjacent carbon atoms or to carbon atoms spaced two or more carbons apart in a single molecule. The carbon atom to which the halogen (or halogens) is (are) attached can be attached to one or more hydrogen atoms or to one or more hydrocarbon radicals, can be attached by double valences to oxygen or sulfur (as in a carbonyl or thiocarbonyl group) or can be attached by double or triple bonds to another carbon atom. The compound containing halogen can be a low molecular weight compound (e.g., carbon tetrachloride or phosgene) or a high molecular weight compound (e.g., neoprene). Other examples are carbon tetrabromide, carbon tetraiodide, bromochlorodiodomethane, chloroform, bromoform, iodoform, bromodichlorofluoromethane, trichlorofluoromethane, methylene dichloride, methyl bromide, ethyl chloride, ethyl bromide, hexachlorethane, trichloroethylene, ethylene dibromide, propyl bromide, isopropyl chloride, 1-iodopropane, formyl chloride, formyl iodide, acetyl bromide, secondary butyl chloride, tertiary butyl chloride, tertiary amyl bromide, tt-octyl chloride, 1,5-dichloropentane and 1,5-dibromopentane. Other useful organic halogen compounds include the following compounds:

1,3,5-tri(bromoethyl) benzene
1,3-dichloro-2-propanone
bis(chloromethyl) ether
bis(1-bromoethyl) ether
1,4-bis(chloromethyl) benzene
bis(1-fluoropropyl) ether
1,1-dichloro-n-butyl ether
1,4-dichloro-2-hexene
4,4-dichloro-2-heptene
1,2-dichlorobenzene
1,4-dichlorobenzene
1,3-dibromobenzene
1,2,3,5-tetrachlorobenzene
hexabromobenzene
1,2-dichloronaphthalene
1,4-dibromonaphthalene
9,10-dibromophenanthrene
2,6-dichloroanthracene
4,4'-dibromodiphenyl
2,2',4,4'-tetrachlorodiphenyl
bromobenzene
p-chlorotoluene
2-iodonaphthalene
allyl chloride
benzyl bromide
1-chloropropane
1-chlorobutane
isobutyl chloride
mixture of chlorinated dodecanes having average of two chlorine atoms per molecule
polyvinyl chloride having a molecular weight of about 1000 or more
benzyl chloride
methallyl chloride
3-chlorobutene-1
styryl chloride
cyclohexyl chloride
1,4-dichlorocyclohexene
propargyl chloride
phenethyl bromide
pinene chloride
norbornyl chloride The reactant polymer can be a "live" polymer, that is, a substantial proportion (i.e., more than 15 percent) of the polymer molecules may each contain one or more alkali metal atoms. Such live polymer qualifies as an alkali metal hydrocarbon for the purposes of this invention. The alkali metal is lithium, sodium, potassium, rubidium or cesium. A live polymer can be made by the known process of polymerizing butadiene or other monomer or mixture of monomers in an inert organic solvent using n-butyllithium or other alkali metal initiator, to produce polymer having one or more terminal alkali metal atom. (Foster U.S. Pat. No. 3,317,918 lists possible lithium initiators, and other initiators may be used.) Other examples of lithium catalysts or initiators are methyllithium, amyllithium, pentamethylene dilithium, lithium metal, phenyllithium, lithium adducts of biphenyl, naphthalene or anthracene and the lithium analog of the Alfin catalyst, all of which are known in the polymerization art. A live polymer can also be formed from a dead polymer by introducing an alkali metal into the polymer molecules by known methods, e.g., by lithiating an unsaturated rubbery polymer by reacting it with n-butyllithium or other hydrocarbon lithium compound; such lithiating reaction can often be activated or accelerated by the addition of an amino chelating agent. The resulting live polymer has one or more alkali metal atom attached to the polymer chain but not usually in a terminal position. If desired, additional alkali metal hydrocarbon, such as n-butyllithium or lithium adduct of biphenyl, can be added to the live polymer prior to or during its reaction with the organic halogen compound and Lewis base to insure an extensive joining reaction.

Alternatively, the reactant polymer is a "dead" polymer, that is, it contains no or substantially no (less than 15 mole percent) alkali metal atoms attached to the polymer molecules. Such dead polymers are produced by "killing" a live polymer by reaction with a stabilizer or a stopping agent (for example an acid), which removes the alkali metal atoms from the polymer molecules. Dead polymers are also produced by polymerization techniques not relying on an alkali metal initiator. Conventional emulsion polymerizations produce dead polymers. Also, dead polymers are produced by ionic polymerizations utilizing $BF_3$ or other Friedel-Crafts reagent as the polymerization catalyst. When a dead polymer is used as the reactant polymer in the process of the invention, it is necessary to utilize a hydrocarbon alkali metal compound (e.g., butyllithium, phenylsodium, lithium adduct of anthracene) as a reagent in addition to the organic halogen compound and the Lewis base.

The polymers utilized in carrying out the invention are plastic and/or rubbery polymers of vinylidene monomers and include, for example, polystyrene, polyethylene, polypropylene, ethylene-vinylacetate copolymers, ethylene-butene-1 copolymers, isobutylene-isoprene copolymers, butadiene polymers (both the homopolymer and copolymers), isoprene polymers (both the homopolymer and copolymers) and chloroprene polymers and copolymers, as well as mixtures of such polymers and/or copolymers. The so-called stereo rubbers have been of great interest in recent years, but the properties of most of these new synthetic rubbers have not been completely satisfactory for all uses, as witness the widespread practice of blending such rubbers with natural rubber or emulsion SBR.

The stereo rubbers may be produced by polymerization of butadiene-1,3 by means of lithium-based catalyst or a coordination catalyst (e.g., a Ziegler catalyst). Preferred linear, rubbery polymers of vinylidene monomers are prepared by polymerization of a conjugated diolefin by means of a lithium-based catalyst in the substantial absence of oxygen-containing organic compounds, air and moisture; rubbery copolymers of butadiene and isoprene or of either or both such diolefin with styrene or methylstyrene are produced by the same technique. Such polymers and methods of making same are disclosed in British Pat. Nos. 814,676; 826,918; 813,198; 817,693; 817,695; 972,258; and 994,726; the disclosures of which are incorporated herein by reference. Such polymerizations utilize lithium initiators to the extent of about 0.001 to about 0.5 gram of active lithium per 100 gram of monomer. Such rubbery linear polymers are characterized by high 1,4-content (85–95 percent of polymer derived from butadiene or isoprene), high linearity and narrow molecular weight distribution. The vulcanizates of such polymers are characterized by excellent physical properties, including high resiliency, low hysteresis, excellent resistance to abrasion, low running temperatures and excellent flexibility and retention of other good physical properties at extremely low temperatures typical of the Arctic in winter, all in comparison with standard emulsion polymerizates, such as commercial SBR. However, such polymers are more difficult to process in standard rubber equipment, such as banbury mixers, mills and tubers, as compared to natural rubber and SBR, so that they are usually mixed with natural rubber and/or SBR for commercial use. Certain of such polymers produced by lithium catalysts also possess undesirable cold-flow properties. Such deficiencies may be corrected by the joining procedure herein disclosed.

The polymers of vinylidene monomers include the broad class indicated above. A preferred class are polymers of those monomers which have been used to produce the diene synthetic rubbers known to the art. The preferred monomers are the conjugated dienes containing from 4 to 12 carbon atoms per molecule and preferably 4 to 8 carbon atoms per molecule. Examples of these compounds include the following: 1,3-butadiene, isoprene, 2,3-dimethyl-1,3-butadiene, 1,3-pentadiene (piperylene), 2-methyl-3-ethyl-1,3-butadiene, 3-methyl1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene and the like. Conjugated dienes containing halogen and alkoxy substituents along the chain can also be employed, such as chloroprene, fluoroprene, 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize. It is preferred that conjugated diolefins be employed and preferred monomers are butadiene, isoprene and piperylene.

In addition to the conjugated dienes other monomers containing a $CH_2=C$ group such as the vinyl-substituted aromatic compounds can be used. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl) styrene
4-methoxystyrene
3,5-diphenoxystyrene
3-decoxystyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-pehnyl-n-propyl)-2-vinylnaphthalene
4-methoxy-1-vinylnaphthalene
6-phenoxy-1-vinylnaphthalene
3,6-dimethylamino-1-vinylnaphthalene
7-dihexoxy-2-vinylnaphthalene and the like. These vinyl-substituted aromatic compounds can be used to form homopolymers or copolymers including block copolymers with each other or with conjugated dienes. Preferred polymers for use in the invention contain some ethylenic unsaturation. Often the polymers used in the invention are liquids (having molecular weights of 1,000 to 30,000) or soft rubbers (having average molecular weights up to about 300,000), but useful results are obtained with reactant polymers of higher molecular weights (as high as about 1,000,000).

The joining of polymers of vinylidene monomers with haloalkanes without an accelerator is often very time consuming. The rate of joining is greatly accelerated by the process of this invention according to which the joining of the polymers is carried out in the presence of a polar substance which acts as a Lewis base, including ethers (including alkyl ethers in which each alkyl group contains 1 to 10 carbon atoms, thioethers, amino ethers, sulfo ethers and phospho ethers, specific examples including dibenzyl ether, diphenyl ether, anisole, 1,2-dimethoxy-ethane), amines, amides (including monoalkyl amides and dialkyl amides in which each alkyl group contains 1 to 10 carbon atoms), epoxides, carboxylic acids, alcohols, phenols, aldehydes (including paraldehyde), esters, ketones, Grignard reagents, heterocyclic compounds (examples including quinoline, pyridine, N-ethylpiperidine, N-methylmorpholine, tetramethylene oxide or tetrahydrofuran, 1,4-dioxane, thiophene, trioxane, coumarin); organic sulfates, sulfites, thiosulfates, thiosulfites, phosphates, phosphites, sulfoxides (including dialkyl sulfoxides in which each alkyl group preferably contains 1 to 10 carbon atoms). Each hydrocarbon group in any of the foregoing organic compounds, if present, preferably contains 1 to 10 carbon atoms and may be aliphatic cycloaliphatic, aromatic or mixed. Certain inorganic Lewis bases can alternatively be utilized, examples being potassium hydroxide, sodium hydroxide, sodium oxide, calcium oxide, sodium amide, calcium nitride and aluminum oxide. A mixture of any of these Lewis bases can be used.

Ethyl ether will usually be employed as the accelerating agent, but other alkyl ethers, including the thioethers, may be used as well as other aliphatic ethers including amino-ethers, sulfo-ethers, phospho-ethers so long as they act as a Lewis base. These ethers include, for example:

diethyl ether
dipropyl ethers
dibutyl ethers
dipentyl ethers
dioctyl ethers
didecyl ethers
methylethyl ether
ethylbutyl ethers
pentyloctyl ethers
diethyl thioether
dipropyl thioethers
dibutyl thioethers
dipentyl thioethers
methylethyl thioether and sulfo- and phospho-ethers in which each alkyl group contains 1 to 10 carbon atoms, for example. The invention includes the use of all other aliphatic ethers with one or more ether linkages (including dialkyl ethers of ethylene glycol) which act as a Lewis base, including cyclic ethers, among which are 1,3- and 1,4-dioxanes and tetrahydrofuran.

The polymers produced by the invention are characterized by improved processing properties, in comparison with polymers which have not been reacted in accordance with the invention or in comparison with similar polymers having molecular weights comparable to those of the novel polymers. The polymers, when rubbery, behave in rubber mills, banbury mixers and extruders as satisfactorily as do emulsion polymers of the conventional SBR types. They are readily utilized in practical rubber compounds without admixture of natural rubber or conventional SBR, although such other rubbers can be mixed with the novel polymers if desired.

The polymers have higher average molecular weights, normally averaging 20 percent to several hundred percent higher than the average molecular weight of the polymer before reaction in accordance with the invention. If the starting polymers are stereolinear, the polymers are usually much less linear than the starting polymers and are often highly branched. They are rubbery with reduced (or no) tendency to cold-flow and present no packaging or shipping problems. The rubbery polymers can be extensively extended with oil (as with 37.5 parts oil per 100 parts polymer) without objectionable cold-flow and they have good processing properties which are not found in the unextended polymers.

The rubbery polymers provide vulcanizates having higher moduli than comparable vulcanizates of comparable prior art polymers. This property enhances their value for many industrial uses, and especially in tire treads and carcass compositions. It also makes possible the use of higher levels of extending oils, allowing use of more economical rubber compositions, providing properties equal to or better than properties of compositions produced from comparable prior art polymers. Vulcanizates of the polymers produced from the stereo synthetic rubbers also, surprisingly, possess the high resilience, high efficiency, low running temperature, high dynamic modulus and low internal friction properties characterizing the starting polymers, and hence are much superior in these respects to vulcanizates of conventional emulsion polymers.

The process of the invention increases the molecular weights of polymers and reduces linearity of stereolinear polymers, producing branching and cross linking; it can be utilized, if desired, to cross link to a polymer to a stage where the polymer displays vulcanizate properties. Such "vulcanizates" have advantages because of the cross links in their structures do not involve sulfur or oxygen linkages but carbon-to-carbon cross links.

A preferred group of joining reagents is the aliphatic halogen compounds. Such compounds are preferably secondary alkyl halides although primary and tertiary alkyl halides can be used, preferably when only a small increase in molecular weight is desired, and the speed of joining is not too important. A mixture of halides may be employed. Commercially it is desirable to use the chlorides rather than the bromides or iodides or fluorides. Monohalogen compounds are preferred although the dihalogen compounds can be employed, as well as compounds containing up to 4 or 5 chlorine atoms. Secondary butyl chloride is preferred. Particularly desirable halogen compounds for the purpose of this invention are carbon tetrachloride, chloroform, isopropyl chloride and 2-chloropentane, in all of which at least one of the halogen atoms is attached to an aliphatic carbon, although there may also be aromatic hydrocarbon portions in the molecule and other halogen may be substituted on such aromatic portions. The aliphatic portion may be saturated or unsaturated aliphatic including alkyl, alkenyl, alkynyl, aralkyl and aralkenyl. While there is no particular limit to the molecular size of the halogen compound since even polymeric materials can be satisfactorily used, there is usually no advantage in having more than 30 carbon atoms, preferably no more than about 12 carbon atoms per molecule. Although other substituent groups can also be present in the halogen compound provided they are inactive under the conditions and with the various reagents present so as not to interfere with the desired reaction, there is no particular advantage in having such other substituent groups since they add nothing to the reaction.

The process of the invention is carried out in the bath in which the polymer was formed at any temperature at which appreciable reaction occurs, generally in the range of $-75°$ C. to $275°$ C. and preferably in the range of $0°$ C. to $150°$ C. The reaction can be carried out under reduced pressure, atmospheric pressure or at superatmospheric pressures. Especially when the reaction is conducted in a volatile solvent or solvent mixture containing a volatile fraction, superatmospheric pressures are convenient to allow use of reaction temperatures above those to which the reaction would be confined at atmospheric pressure. Superatmospheric pressures are also desirable when the halogen compound or the Lewis base, utilized in the reaction, is volatile. The reaction temperatures required for practical operations are generally higher in the case in which the halogen compound contains only one halogen atom (especially fluorine) per molecule, as compared, respectively, to the case in which additional lower alkyllithium (e.g., n-butyllithium is used, or the case in which a multihalogen compound (e.g., carbon tetrachloride) is employed as the halogen compound.

The amounts of halogen compound and accelerator used in carrying out the reaction depend upon the amount of alkali metal in the live polymer and/or in other alkali metal hydrocarbon employed, the desired speed of the joining reaction and the desired increase in molecular weight. The relative reactivities of the specific halogen compound and Lewis base utilized are also to be taken into account. In the process of the invention the molar ratio of organic halogen compound to the alkali metal hydrocarbon generally will be between 1000/1 and 1/100, although usually the ratio lies between 100/1 and 1/10. The molar ratio of the Lewis base utilized to the alkali metal hydrocarbon present for the joining reaction usually will be between 1/10 and 100/1. Larger excesses of the two reagents, the halogen compound and the Lewis base, can be employed but are seldom necessary for accomplishing the desired degree of joining. The joining reaction is preferably carried out in solution, and usually in the solvent in which the polymerization has been carried out, which is generally a hydrocarbon solvent such as a pentane and/or hexane and/or heptane and/or benzene. Air is excluded.

The invention is further described by means of the following examples, in which parts are expressed by weight unless otherwise indicated.

EXAMPLE 1

Four bottles of 1,3-butadiene monomer dissolved in hydrocarbon solvent were polymerized at 50° C., using n-butyllithium initiator, yielding a polymer having a relatively narrow molecular-weight distribution and approximately 80 percent live lithium ends capable of undergoing a joining reaction with sec-butyl chloride. Care was taken to first free the bottles of moisture, peroxides and other impurities that would terminate the live anionic polymer ends. The "live" polymer in one of the four bottles served as a control, while measured quantities of sec-butyl chloride (BuCl) and ethers were added to the other three bottles. All bottles were placed in an 80° C. polymerization vessel and allowed to react for 1, 2 and 3 hours, respectively. The bottles were then removed from the vessel and the joining reaction in each was terminated with methanol. The resulting polymers were dried and the Williams recovery value of each was determined to estimate the relative amounts of joining that had taken place after 1, 2 and 3 hours. The results are recorded in table I. The reactant ratios in table I are expressed as moles of the butyl chloride or the ether per gram atom of active lithium in the butyllithium initiator used in the polymerization of the butadiene.

TABLE I

| Ether | BuCl/Li | Ether/Li | \multicolumn{4}{c}{Williams recovery value *} |
|---|---|---|---|---|---|---|
| | | | 0 hr. | 1 hr. | 2 hrs. | 3 hrs. |
| None | 0.80 | None | 0.10 | 0.25 | 0.70 | 1.37 |
| Diethyl ether | 0.80 | 10:0 | 0.11 | 5.08 | 6.31 | 6.34 |
| Tetrahydrofuran | 0.80 | 1:1 | 0.10 | 4.76 | 6.01 | 6.68 |
| 1,4-dioxane | 0.80 | 1:1 | 0.11 | 0.98 | 2.80 | 4.43 |

*In accordance with ASTM Designation: D 926–56, published in ASTM Standards on Rubber Products, pages 472–474 (1957), except that tests were made at room temperature (about 23° C.), no talc was used and recovery values are actual measurements in mm. 1 minute after removal of the load, which had been applied to the rubber sample for 7.5 minutes.

Homopolymers of butadiene having a Williams recovery value greater than 0.75 exhibit nonflow properties; conversely, such polymers having a recovery value of less than 0.75 exhibit objectionable flow properties. One purpose of the joining is to produce a polymer with reduced cold flow properties. Without the addition of ether more than 2 hours were required to achieve a Williams recovery value of more than 0.75. However, with the addition of diethyl ether, a recovery value of 5 was achieved in the first hour, indicating that the ether, indeed, has accelerated the rate of joining so that the desired minimum Williams recovery value is obtained in a matter of minutes. Tetrahydrofuran is almost as good an accelerator as ether. Dioxane accelerates the speed of joining, but not as much.

EXAMPLE 2

Butadiene-1,3 in inert (BD) was polymerized at 50° C. in inert hydrocarbon solvent with 0.72 mm. (millimole) of n-butyllithium (BuLi) as initiator. After 9 hours, sec-octyl bromide ($C_8H_{17}Br$) was added to the live polymer in each of two bottles. To two other bottles, tetrahydrofuran (THF) and sec-octyl bromide were added and heating of the four bottles was continued at 80° C. for 1 and 2 hours. The data regarding the polymerization and joining reactions are given in table II (amounts of butadiene being given in grams) together with the dilute solution viscosity (D.S.V.), gel and Williams recovery values (Wms.Rec.).

TABLE II

| Run | No. 1 | No. 2 | No. 3 | No. 4 |
|---|---|---|---|---|
| Polymerization | | | | |
| BD, gm. | 32.3 | 32.1 | 30.4 | 28.9 |
| BuLi, mm. | 0.233 | 0.231 | 0.218 | 0.208 |

Table II—Continued

| | | | | |
|---|---|---|---|---|
| Joining | | | | |
| Time | 1 hr. | 2 hrs. | 1 hr. | 2 hrs. |
| $C_8H_{17}Br$ | 5.85 mm. | 5.78 mm. | 5.45 mm. | 5.20 mm. |
| THF | | | 2.18 mm. | 2.08 mm. |
| Properties | | | | |
| D.S.V. | 2.48 | 2.64 | 2.51 | 3.09 |
| Gel, % | 0 | 0 | 0 | 0 |
| Wms. Rec. | 0.65 | 1.77 | 2.34 | 4.00 |

From table II one can readily see that the use of an ether in conjunction with secondary octyl bromide as a joining agent has accelerated the rate of increasing the molecular weight of the polymer. For instance, after one hour at 80° C. the material containing no ether had a Williams recovery value of 0.65 whereas the material containing the ether attained a Williams recovery value of 2.34.

EXAMPLE 3

In this experiment, butadiene-styrene copolymer was joined wit sec-butyl chloride. The polymer (BD/St) was a live polymer produced by polymerizing approximately 75 percent by weight of 1,3-butadiene and 25 percent of styrene in an inert hydrocarbon solvent using n-butyllithium (BuLi) as initiator. The ratio of the sec-butyl chloride to lithium was 6 to 1 in all three runs. Table III gives data for the polymerizations, the joining reactions and properties of the products. In run No. 1, only sec-butyl chloride (BuCl) and n-butyllithium were added, and the reaction was continued for 17 hours. To runs No. 2 and No. 3, tetrahydrofuran (THF) was added in the mole ratio of 1:1, and the total added is given. The joining was carried out at 80° C.

TABLE III

| Run | No. 1 | No. 2 | No. 3 |
|---|---|---|---|
| Polymerization | | | |
| Monomer, gms. | 19.0 | 18.8 | 19.0 |
| BuLi, mm. | 0.228 | 0.226 | 0.228 |
| Joining | | | |
| Time | 17 hrs. | 1 hr. | 2 hrs. |
| BuCl/Li (6:1) | 1.37 mm | 1.35 mm. | 1.37 mm. |
| Li/THF (1:1) | | 0.226 mm. | 0.228 mm. |
| Properties | | | |
| D.S.V. | 0.70 | 1.40 | 1.62 |
| Gel | 0 | 0 | 0 |
| Wms. Rec. | 5.83 | 2.81 | 5.50 |

Table III indicates the pertinent differences between those runs that contained an ether and the one that did not. In run No. 3 a Williams recovery value of 5.5 was achieved in 2 hours as compared to a recovery value of 5.83 in run No. 1 attained only after 17 hours.

The sec-butyl chloride used in the foregoing was the practical grade and was kept dry over calcium hydride. All ethers were tested for peroxides with potassium iodide and glacial acetic acid, and were distilled from sodium hydroxide when peroxide was present. The ethers were dried with sodium ribbon or calcium hydride.

EXAMPLE 4

Rubbery polybutadiene produced in a conventional free radical emulsion system is dissolved in commercial hexane, and the solution is dried and treated to remove active hydrogen compounds. Butyllithium is added to the purified solution in an amount of sufficient to introduce alkali metal into the polymer to the extent that the polymer contains 70 gram-atoms of lithium per 100 moles of the polymer. Then tetrahydrofuran and carbon tetrachloride are added in amounts substantially equivalent to the alkali metal in the polymer. The reaction mixture is heated at 80° C. for two hours. The product has a molecular weight substantially higher than that of the initial polybutadiene and possesses improved extrusion and milling properties.

EXAMPLE 5

A polybutadiene having a cis-content of more than 90 percent was prepared by the polymerization of butadiene-1,3 in the presence of a catalyst system formed by mixing triisobutylaluminum, titanium tetrachloride and iodine. The product was gel free, had an inherent viscosity of 2.06, a Mooney viscosity value (ML-4 at 100° C.) of 30 and exhibited objectionable cold flow properties. The polybutadiene rubber is dissolved in commercial heptane, and sufficient n-butyllithium is added to the solution to provide one mole of the alkyllithium for each polymer molecule. To this solution is added 2-bromopentane in molar amount equal to the butyllithium employed and also three molar equivalents of di-n-butyl ether. Then the mixture is heated for 2 hours at 85° C. and the rubbery product is recovered from the reaction mixture. The product is found to have a substantially increased Mooney viscosity and to exhibit no cold flow properties.

We claim:

1. Process of joining the molecules of a rubbery polymer of the class consisting of homopolymers and copolymers of butadiene and isoprene and copolymers of butadiene and isoprene with styrene, wherein the improvement comprises reacting the polymer at a temperature of −75° C. to 275° C. with a secondary alkyl monohalide in which the alkyl group contains 4 to 8 carbon atoms, in the presence of a Lewis base of the class consisting of aliphatic and cyclic oxygen ethers containing 4 to 8 carbon atoms, (a) there being at least one lithium atom on the polymer or (b) carrying out the reaction in the presence of butyllithium.

2. The process of claim 1 in which polybutadiene is treated.

3. The process of claim 1 in which butadiene-styrene copolymer is treated.

4. The process of claim 1 in which polyisoprene is treated.

5. Process of claim 6 in which the polymer is polyisoprene.

6. Process of claim 1 in which the reacting polymer initially contains a substantial proportion of polymer molecules each containing at least one lithium atom.

7. Process of claim 6 in which the polymer is polybutadiene.

8. Process of claim 6 in which the polymer is a butadiene-styrene copolymer.

9. Process of claim 1 in which the reacting polymer initially contains substantially no lithium combined therewith and the polymer is reacted with the halide and Lewis base in the presence of added butyllithium.

10. Process of claim 4 in which a secondary alkyl monohalide in which the alkyl group contains 4 to 8 carbon atoms is used as a halide and the Lewis base is tetrahydrofuran.

11. Process of claim 6 in which a secondary alkyl monohalide in which the alkyl group contains four to eight carbon atoms is used as a halide and the Lewis base is diethyl ether.

12. Process of claim 6 in which a secondary alkyl monohalide in which the alkyl group contains four to eight carbon atoms is used as a halide and the Lewis base is 1,4-dioxane.

13. Process of claim 9 in which a secondary alkyl monohalide in which the alkyl group contains four to eight carbon atoms is used as the halide and the Lewis base is tetrahydrofuran.

14. The process of claim 9 in which the halide is a secondary alkyl monohalide in which the alkyl group contains four to eight carbon atoms and the Lewis base is diethyl ether.

15. The process of claim 9 in which the halide is a secondary alkyl monohalide in which the alkyl group contains four to eight carbon atoms and the Lewis base is 1,4-dioxane.

PO-1050
(5/69)

UNITED STATES PATENT OFFICE
CERTIFICATE OF CORRECTION

Patent No. 3,607,846                            Dated September 21, 1971

Inventor(s)  Adel F. Halasa and David P. Tate

It is certified that error appears in the above-identified patent and that said Letters Patent are hereby corrected as shown below:

Col. 1, line 26, "single-carbon" should read --single carbon--

Col. 3, lines 41-42, "3-methyl1,3-pentadiene" should read
    --3-methyl-1,3-pentadiene--

Col. 4, line 35, "pehnyl" should read --phenyl--

Col. 7, line 55, "in inert" should be omitted.

Col. 8, line 67, "of" should be omitted.

Signed and sealed this 25th day of April 1972.

(SEAL)
Attest:

EDWARD M. FLETCHER, JR.                ROBERT GOTTSCHALK
Attesting Officer                      Commissioner of Patents